March 10, 1959  H. J. MURPHY  2,876,514
HOSE CLAMP
Filed Dec. 13, 1955
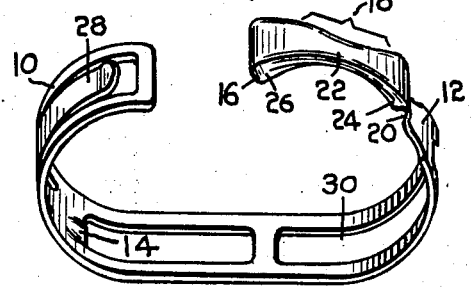
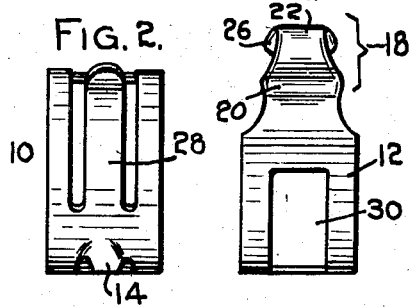
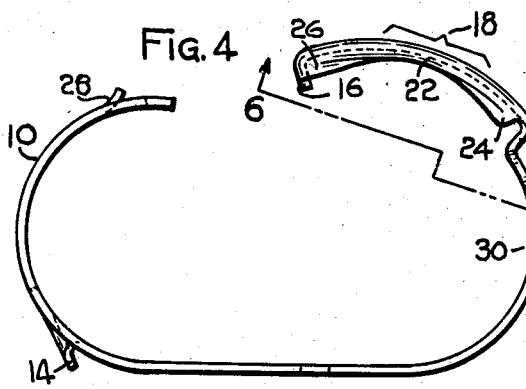
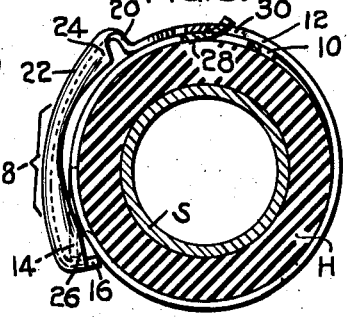
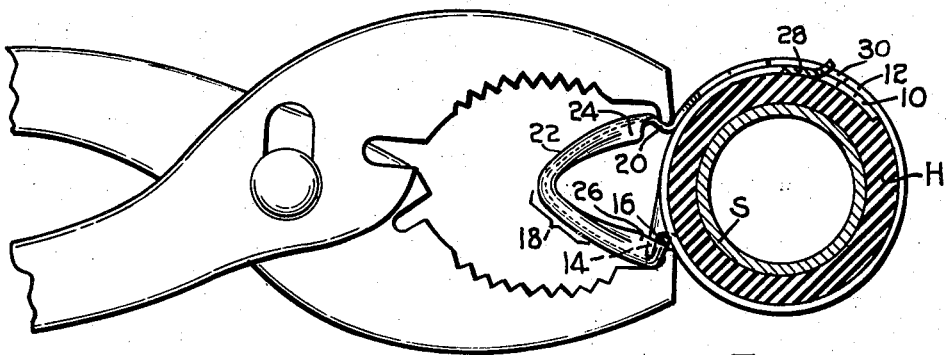
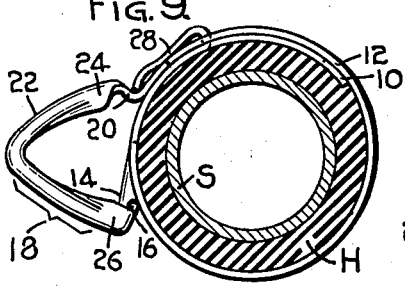
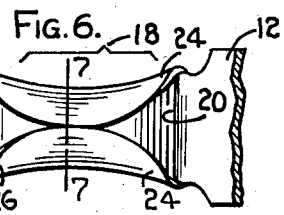
INVENTOR:
HOWARD J. MURPHY,
BY Robert E Ross
ATTORNEY.

United States Patent Office 2,876,514
Patented Mar. 10, 1959

2,876,514

HOSE CLAMP

Howard J. Murphy, North Wilmington, Mass., assignor to United-Carr Fastener Corporation, Boston, Mass., a corporation of Delaware Application December 13, 1955, Serial No. 552,775

7 Claims. (Cl. 24—20)

This invention relates to a clamp of the type comprising a band which encircles the parts to be joined, and is tightened around them. A well-known example of such a clamp is the so-called hose clamp for securing the end of a flexible tube by centripetal pressure to a rigid pipe or sleeve over which it is telescoped. In accordance with my invention, I provide a device of this character by providing in the circuit of the band a humped portion which may be buckled or folded up outwardly to draw together the points where it merges into the rest of the band so as to constrict the same and which will remain in such buckled position to maintain the resultant pressure on the enclosed part.

My invention will be well understood by reference to the description of an illustrative embodiment thereof shown by way of example in the accompanying drawings wherein:

Fig. 1 is a perspective of the clamp in open position;

Figs. 2 and 3 are end elevations as seen respectively from the left and right of Fig. 1. To avoid confusion, parts of the opposite end lying in the rear are not indicated;

Fig. 4 is a side elevation;

Fig. 5 shows the clamp applied about a hose and joined in encircling relation thereto, parts being broken away;

Fig. 6 is a view of the inner side of the hump portion of the clamp as seen from line 6—6 in Fig. 4;

Fig. 7 is a section on the line 7—7 of Fig. 6;

Fig. 8 is a view similar to Fig. 5 showing the clamp constricted on the work by means of a tool as shown; and Fig. 9 is a similar view showing the application of a locking device to the constricted clamp.

Figs. 1–4 show the clamp in an opened up condition as it might be supplied to the user in the first instance. The example shown is made of a single strip of sheet metal of suitable character which is desirable although not necessary. The band may have an end portion 10 which will underlie in use (Fig. 8) the other and overlying end portion 12 so that the hose H telescoped on sleeve S will be gripped continuously throughout its circumference. The clamp shown has a break in its continuity to permit it to be applied to the work from the side and therefore the connection of the overlying end to a point remote from the extremity of the underlying end may be a separable one as here illustrated. For this purpose a tooth 14 struck from the metal at such a remote point provides a catch facing away from the extreme end and the extremity of the overlying end 12 may have an inturned flange 16 adapted to hook behind the tooth 14.

The clamp in the open position shown in Fig. 4 may be applied about the hose H and wrapped around the same and its ends joined by engaging the hook 16 behind the tooth 14. This can ordinarily be accomplished by mere finger pressure. In this position the band will exert little or no pressure on the hose. In order to permit the effective circumference of the band to be shortened to constrict it to the hose, I provide a hump indicated generally by the numeral 18 which in this case constitutes the extreme portion of the overlying end 12. It may be formed by two short, outwardly extending flanges 20 and 16 (the latter serving in this instance as the hook already referred to for engaging the tooth 14), the upper ends of which flanges are joined by an arched back 22. That is, the metal here is bowed out eccentrically to the curve of the article to be clamped, and this may be done desirably along two curves intersecting at the middle, although a whole or a part of these two sections could be flat, approximating the legs of a triangle of very low altitude. The essential point is that the central portion should be offset outwardly between two shoulders provided by the flanges 16 and 20 or, perhaps more accurately, by the lines of junction of these flanges with the back, and which constitute the ends of the arched or peaked portion between them, so that pressure applied to these shoulders to force them toward each other will cause the bowed back 22 to buckle outwardly, substantially along a central line of fold, from the position shown in Fig. 5 to the position shown in Fig. 8 with consequent traction on the rest of the band and tightening of the same about the hose with the overlying end 12 holding down the underlying end 10.

The buckling of the hump may be effected by using a simple hand-operated tool such as the pair of pliers shown in Fig. 8, applied to shoulders 16 and 20. It is very quickly done. The pliers may be applied and closed with a substantially single and continuous movement of the hand. For example, in a specific instance of a clamp formed as illustrated and made of soft cold rolled steel 1/32 of an inch thick, with the distance between the shoulders at the extremities of the hump about one inch, the hump was easily collapsed and the band tightened with a take-up of about a half inch by moderate hand pressure exerted through a pair of ordinary six-inch slip joint pliers. In production line work a suitable tool having movable jaws actuated by compressed air or otherwise moved by power may be employed. When buckled in the manner described the buckled up hump will not stretch out again under conditions of use, but will retain the position shown and maintain its grip on the hose.

The hump has a preferential zone of bend at the center of its back, the two segments at either side thereof operating as levers. A sharp bend along single line would be undesirable and the crest or peak of the buckled hump should effectively resist straightening out under the strains of use, which however are less favorably applied as compared with the bucking force arising from the pressing together of the shoulders at the ends of the hump. The structure shown is particularly advantageous. The margins of the strip are bent inwardly along the sides of the hump to provide perpendicular flanges 24 and 26 along the end portions of the hump which serve as reinforcing ribs for these portions which operate as levers in the buckling action. As the central portion of the hump is approached the width of these bent under margins is increased and the angle of bending increased until at the center they are folded down flat. The central portion of the hump is thus narrow but of double thickness and bends smoothly, but with maximum resistance for the amount of metal present, as a beam about a central neutral axis. At the same time the end portions move as substantially rigid levers due to their flanges. The buckled portion thus takes approximately the form of a strong rounded arch the springing points of which are the flanged end portions. The flanges 26 may be integral with the end flange 16, which forms the hook for engaging over tooth 14, thus reinforcing the hook. The relatively great width of this end of the hump as compared with the central portion permits the tooth 14 to be wide and therefore of adequate strength.

While, as explained, the buckled up hump will maintain its position in use in the position of Figs. 8 and 9, if it is desired the underlying end 10 may be slitted as best seen in Fig. 1 to provide a tongue 28 which, when the parts are constricted, advances beneath a cut out slot 30 in the overlying end as shown in Fig. 8, and the end of this tongue may be bent up as shown in Fig. 9 around the end of the wall of this slot to hold the band in the constricted position to which it has been brought by the buckling of the hump. In this case the hump portion could be flattened out again if desired or unhooked and broken off at the point 20. However its presence as a slight projection is unobjectionable in most cases, particularly in view of the rounded form of the edges provided by the flanges 16, 20, 24, 26.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A clamp comprising a band for encircling the parts to be clamped having an underlying end portion and an overlying end portion and means for engaging the overlying portion to the underlying portion remote from the extremity of the latter, to give the band a generally circular form, the band except for the bent portion hereinafter referred to being substantially flat and flexible to permit it to be constricted into such circular form about the encircled parts, a portion of the band exposed when the parts are so engaged being bent to provide outwardly directed shoulders jointed by an arched back, the back being narrowed at its central portion and having lateral flanges the central portions of which are turned in flat against the interior face of the central portion of the back.

2. A clamp comprising a band for encircling the parts to be clamped which band is essentially continuous and, except for the hump to be referred to, substantially uniformly flexible to opermit it to be constricted in diameter in the operation of joining its ends to form a clamping ring, the band having an underlying end portion, engaging means remote from the extremity of the underlying end portion, means at the extremity of the overlying portion for interlocking with the engaging means, a portion of the overlying end portion substantially immediately inward of its extremity being outwardly humped, the span of the hump being less than the distance from the engaging means to the extremity of the underlying portion so that the ends of the hump will, when the ends of the band are engaged, rest on the underlying portion, the hump having shoulders at its ends providing abutments for the application of pressure to slide the ends of the hump together over the underlying end portion with resultant buckling of the hump about an intermediate point and consequent tightening of the band on the enclosed parts in direct contact therewith throughout the circumference.

3. A clamp as set forth in claim 2 wherein lateral portions of the hump are relatively stiff and the central portion between them relatively flexible whereby as a result of pressing together the abutments the lateral portions move substantially as pivoted arms to collapse the hump into a more peaked form.

4. A clamp comprising a band for encircling the parts to be clamped having an underlying end portion and an overlying end portion and means for engaging the overlying portion to the underlying portion remote from the extremity of the latter to give the band a generally circular form the band except for the hump hereinafter referred to being substantially flat and flexible to permit it to be constricted into such circular form about the encircled parts a portion of the band which is exposed when the end portions are so engaged being outwardly humped and presenting shoulders at the ends of the hump providing abutments for the application of pressure to push together the ends of the hump with resultant buckling of the hump about an intermediate point and consequent tightening of the band on the work the central portion of the hump having its margins doubled over to define a zone of preferential bending in the form of a relatively narrow and relatively deep beam.

5. A clamp comprising a band for encircling the parts to be clamped having an underlying end portion and an overlying end portion and means for engaging the overlying portion to the underlying portion remote from the extremity of the latter to give the band a generally circular form the band except for the hump hereinafter referred to being substantially flat and flexible to permit it to be constricted into such circular form about the encircled parts a portion of the band which is exposed when the end portions are so engaged being outwardly humped and presenting shoulders at the ends of the hump providing abutments for the application of pressure to push together the ends of the hump with resultant buckling of the hump about an intermediate point and consequent tightening of the band on the work the portion of the hump on either side thereof being stiffened by ribs.

6. A clamp comprising a band for encircling the parts to be clamped having an underlying end portion and an overlying end portion and means for engaging the overlying portion to the underlying portion remote from the extremity of the latter to give the band a generally circular form, the band except for the hump hereinafter referred to being substantially flat and flexible to permit it to be constricted into such circular form about the encircled parts, a portion of the band which is exposed when the end portions are so engaged being outwardly humped and presenting shoulders at the ends of the hump providing abutments for the application of pressure to push together the ends of the hump with resultant buckling of the hump about an intermediate point and consequent tightening of the band on the work, the end portions of the hump having marginal flanges at their sides and at their relatively remote ends and also having between them a zone of preferential bending, the end flanges providing the shoulders referred to and one end flange providing a hook for engaging the parts together.

7. A clamp as set forth in claim 6 wherein said one end flange is integrally joined to the adjacent marginal flanges.

References Cited in the file of this patent

UNITED STATES PATENTS

| 1,826,018 | Pagel | Oct. 6, 1931 |
| 2,336,139 | Vogel | Dec. 7, 1943 |
| 2,614,304 | Oetiker | Oct. 21, 1952 |
| 2,636,918 | Healy | Apr. 28, 1953 |